US006884876B2

(12) United States Patent
Oh et al.

(10) Patent No.: US 6,884,876 B2
(45) Date of Patent: Apr. 26, 2005

(54) DISPERSE-REACTIVE DYES CONTAINING ACETOXYETHYLSULFONE OR VINYLSULFONE AND THEIR PROCESS

(75) Inventors: Sea Wha Oh, Daejeon (KR); Seung Rim Shin, Daejeon (KR); Tae Kyung Kim, Daejeon (KR); Sun Il Kim, Daejeon (KR); Jong Il Shin, Daejeon (KR)

(73) Assignee: Korea Research Institute of Chemical Technology (KR)

( * ) Notice: Subject to any disclaimer, the term of this patent is extended or adjusted under 35 U.S.C. 154(b) by 0 days.

(21) Appl. No.: 10/466,356
(22) PCT Filed: Jan. 16, 2002
(86) PCT No.: PCT/KR02/00069

§ 371 (c)(1),
(2), (4) Date: Jul. 16, 2003

(87) PCT Pub. No.: WO02/057370

PCT Pub. Date: Jul. 25, 2002

(65) Prior Publication Data

US 2004/0077846 A1 Apr. 22, 2004

(30) Foreign Application Priority Data

Jan. 17, 2001 (KR) .......................................... 2001-2733
Jan. 18, 2001 (KR) .......................................... 2001-3009
Jan. 29, 2001 (KR) .......................................... 2001-4026

(51) Int. Cl.$^7$ ............................................. C09B 62/51
(52) U.S. Cl. ....................................................... 534/642
(58) Field of Search ......................................... 534/642

(56) References Cited

U.S. PATENT DOCUMENTS 4,614,521 A  * 9/1986 Niwa et al. ................... 8/471
4,820,806 A  * 4/1989 Baumann et al. ........... 534/605

FOREIGN PATENT DOCUMENTS

DE       2106648   * 8/1972
EP         33527   * 8/1981
EP        109029   * 5/1984

OTHER PUBLICATIONS

Le et al., Chemical Abstracts, 109:111932, 1988.*
Zhang et al., Chemical Abstracts, 109:7904, 1988.*
Zhu et al., Chemical Abstracts, 113:154257,1990.*
Farag et al., "Studies on Some New Reactive Disperse Dyes," Journal of the Society of Dyers and Colourists, vol. 96, pp. 126–132, 1980.
Burkinshaw et al., "The Dyeing of Conventional and Microfibre Nylon 6.6 with Reactive Disperse Dyes," Dyes and Pigments, vol. 25, pp. 31–48, 1994.
Brady et al., "Evaluation of Some Reactive Disperse Dyes for Sublimation Transfer Printing of Wool," Journal of the Society of Dyers and Colourists, vol. 97, pp. 159–164, 1981.

* cited by examiner

Primary Examiner—Flona T. Powers
(74) Attorney, Agent, or Firm—Finnegan, Henderson, Farabow, Garrett & Dunner, L.L.P.

(57) ABSTRACT

The present invention relates to water insoluble disperse-reactive dyes expressed by the formula (3) and (4) and to their preparation, (3) (4) wherein each of $Ar_1$ and $Ar_2$ represents aryl or benzothiazole group, and each of R, $R_1$, $R_2$, and $R_3$ independently represents hydrogen, alkyl, alkoxy, cyanoalkyl or aminoacetyl group.

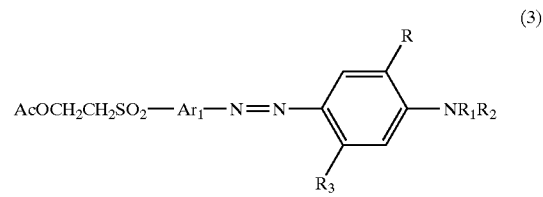

(3)

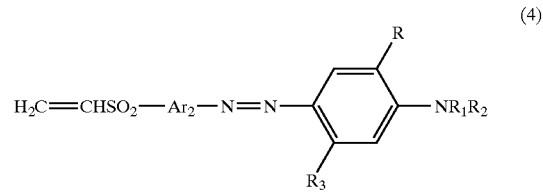

(4)

6 Claims, No Drawings

DISPERSE-REACTIVE DYES CONTAINING ACETOXYETHYLSULFONE OR VINYLSULFONE AND THEIR PROCESS

BACKGROUND OF THE INVENTION

1. Field of the Invention

The invention relates to new disperse-reactive dyes and to their preparation. More specifically, the present invention relates to the disperse-reactive dyes with acetoxyethylsulfone and vinylsulfone as reactive groups represented by the formula (1) and (2),

(1)

(2)

wherein each of $Ar_1$ and $Ar_2$ is aryl or benzothiazole.

As used herein, "AcO" represents an acetoxy group.

According to the invention, there are provided water insoluble disperse-reactive dyes expressed by the formula (3) and (4).

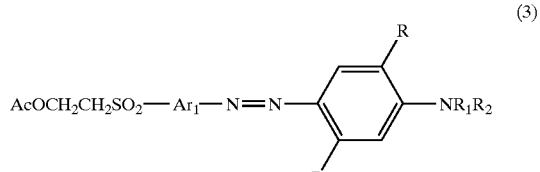

(3)

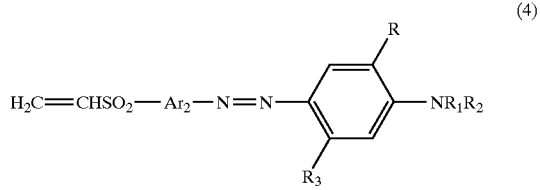

(4)

wherein each of $Ar_1$ and $Ar_2$ represents aryl or benzothiazole group, and each of R, $R_1$, $R_2$, and $R_3$ independently represents hydrogen, alkyl, alkoxy, cyanoalkyl or aminoacetyl group.

2. Description of the Related Art

For dyeing of wool, silk, nylon and polyurethane, there have been generally employed water-soluble dyes such as acid dyes, metal complex dyes and reactive dyes. The largest number of acid and metal complex dyes are constituted azo dyes, which are capable of releasing some carcinogenic aromatic amines as a result of the reductive cleavage of azo bonds. It has been also reported that azo dyes can be metabolically cleaved by enzymatic reduction in the human organs.

In 1995, the German law on harmful substances listed 20 hazardous aromatic amines, and prohibited the import as well as selling of textiles and goods dyed with dyestuff based on cleavable those amines. Recently, the environmental protection are becoming important concern, therefore the use of metal complex dyes including heavy metals has been strictly regulated. The conventional acid and metal complex dyes have high water solubility, and they cause dyeing wastewater containing a high concentration of residual dyes. And also those dyes give poor washing fastness. The conventional reactive dyes exhibit very good washing fastness by forming a covalent bond between fiber and dye. However the dyeing with reactive dyes is carried out under alkali condition, it may cause degradation of wool or silk fiber.

In 1960, the water-insoluble disperse-reactive dyes were introduced by ICI (Imperial Chemical Industries Ltd.) as Procinyl dyestuff.

In present several disperse-reactive dyes are commercially available and the research is continuously progressing.

SUMMARY OF THE INVENTION

An object of this invention is to provide water-insoluble disperse-reactive dyes which have reactive group to form covalent bond with fibers, and do not include carcinogenic harmful amines or heavy metals.

As a result of continuous studies in order to prepare water-insoluble disperse-reactive dyes of high brilliance and fastness, especially washing fastness, the inventors completed this invention by synthesizing water-insoluble disperse-reactive dyes having acetoxyethylsulfone and vinylsulfone as reactive group.

DETAILED DESCRIPTION OF THE INVENTION

This invention provides water-insoluble disperse-reactive dyes represented by the general formula (3a), (3b), (4a) and (4b), which is combined with reactive groups such as β-acetoxyethylsulfone or vinylsulfone group,

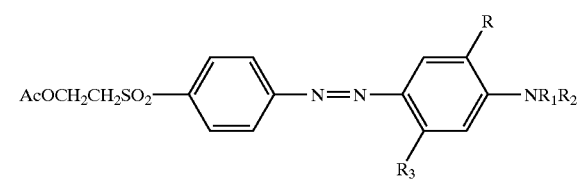

(3a)

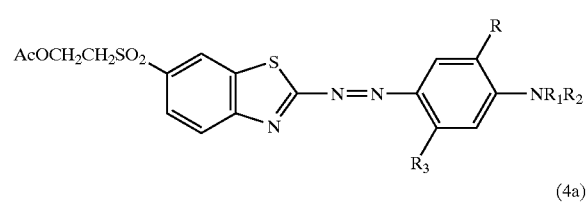

(3b)

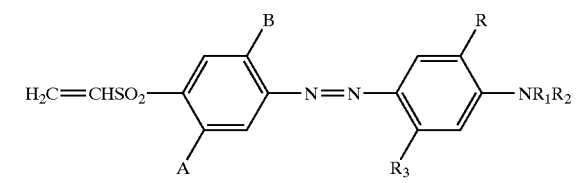

(4a)

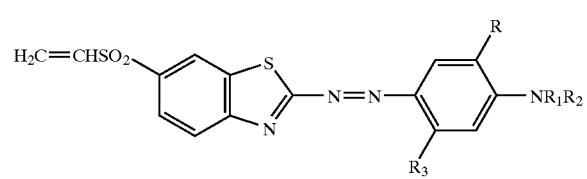

(4b)

wherein each of A and B represents hydrogen, alkyl or alkoxy group, and each of R, $R_1$, $R_2$, and $R_3$ independently represents hydrogen, alkyl, alkoxy, cyanoalkyl or aminoacetyl group.

In accordance with one aspect of the present invention, there is provided a process for the production of water-insoluble disperse-reactive dyes which are suitable for the dyeing of wool, silk, nylon, polyurethane and mixed-fibers.

According to this invention, the disperse-reactive dyes having β-acetoxyethylsulfone or vinylsulfone group are prepared as follows;

(a) diazotizing each of 4-aminophenyl-β-acetoxyethylsulfone, 2-amino-5-(β-acetoxyethylsulfone)benzothiazole, 2,5-substituted-aminophenyl-4-vinylsulfone or 2-amino-5-vinylsulfonebenzothiazole expressed by the following formula 5, 7, 10 and 11; and (b) coupling said diazotized compound with the coupler of formula 6 keeping in acidic condition.

The individual preparation methods are described more in detail as shown in Scheme 1, 2, 3, 5 and 6.

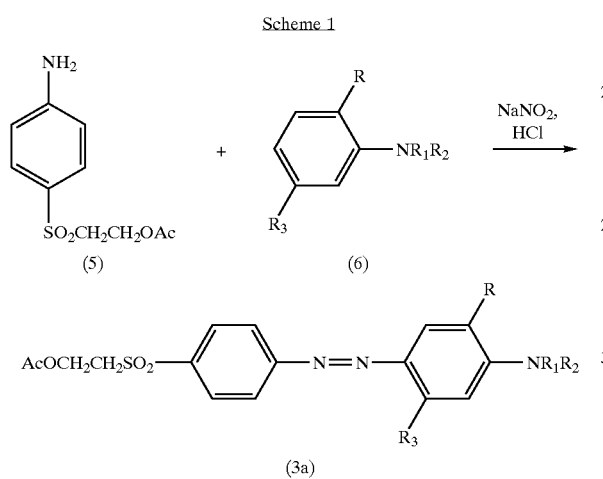

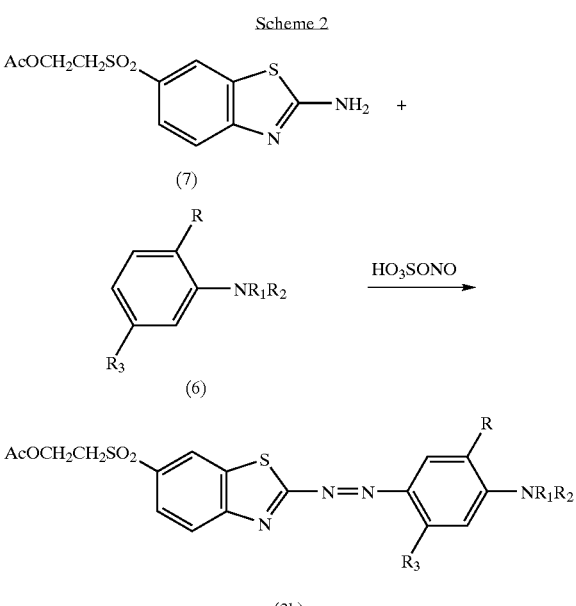

wherein each of R, $R_1$, $R_2$, and $R_3$ independently represents hydrogen, alkyl, alkoxy, cyanoalkyl or aminoacetyl group.

According to the above Scheme 1, the preparation method of disperse-reactive dye expressed by the formula 3a is explained in more detail.

4-Aminophenyl-β-acetoxyethylsulfone of formula 5 is diazotized. A generally available diazotization method is adapted, which means that after dispersing the 4-aminophenyl-β-acetoxyethylsulfone in water at 0–5° C. and the diazotization reaction is carried with the addition of concentrated hydrochloric acid and $NaNO_2$. And the coupler solution under acidic condition is cooled down below 5° C. to carry out the coupling reaction with the diazotized compound at 0–5° C. And then the prepared coupler solution is slowly added to the diazotized solution at 0–5° C., stirred, neutralized with alkali solution, preferably to the pH 6.5 and filtered to obtain a final product.

As a raw material, 4-aminophenyl-β-acetoxyethylsulfone compound presented by the formula 5 is synthesized by the simple reaction of 4-acetaminophenyl-β-hydroxyethylsulfone with a mixture of hydrogen chloride and acetic acid (Korea Patent No 198829).

The preparation method of the disperse-reactive dyes having 2-amino-5-(β-acetoxyethylsulfone)benzothiazole of formula 3b is expressed in more detail the following Scheme 2, wherein each of R, $R_1$, $R_2$, and $R_3$ independently represents hydrogen, alkyl, alkoxy, cyanoalkyl or aminoacetyl group.

According to the present invention, the disperse-reactive dyes of formula 3b may be prepared in various preparing methods, which is differentiated by starting material used.

The above Scheme 2 represents 2-amino-5-(β-acetoxyethylsulfone)benzothiazole of formula 7 is used as a starting material, on the other hand 2-amino-5-(β-hydroxyethylsulfone)benzothiazole of formula 8 can also be used as a starting material as shown in the following Scheme 3,

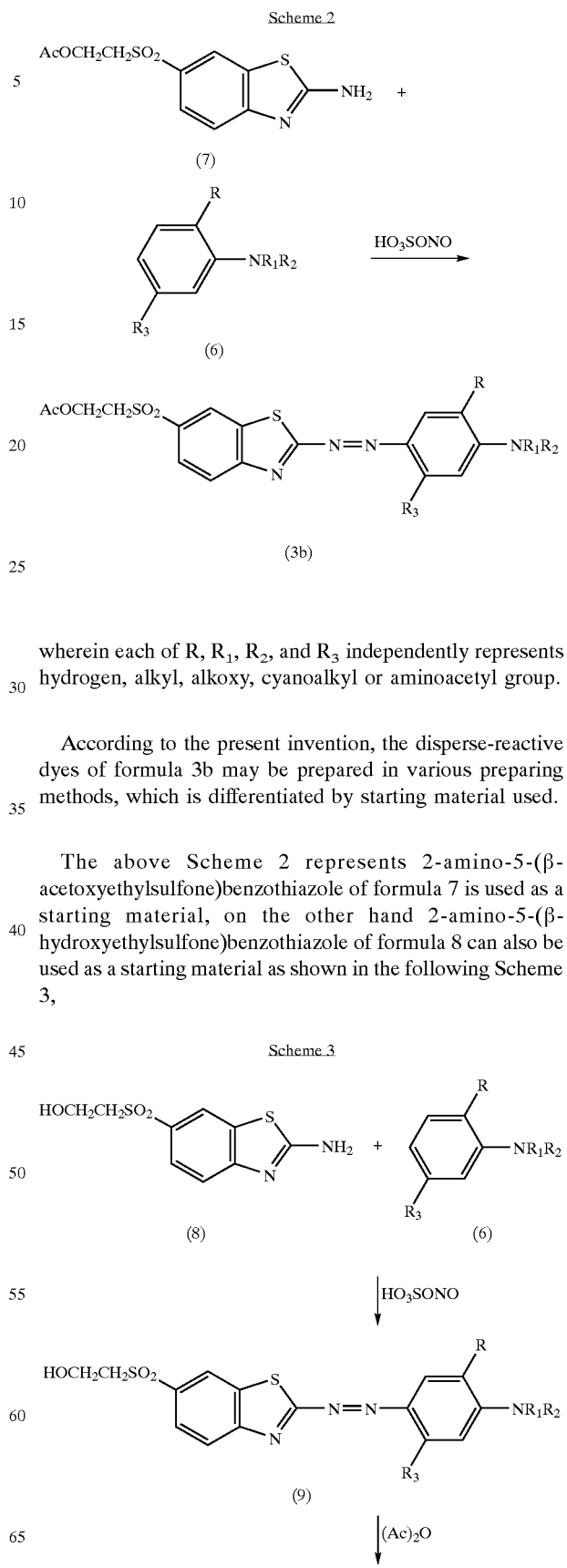

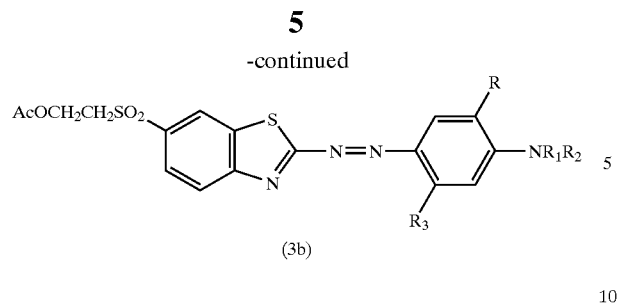

(3b)

wherein each of R, $R_1$, $R_2$, and $R_3$ independently represents hydrogen, alkyl, alkoxy, cyanoalkyl or aminoacetyl group.

The preparation method of the Scheme 2 is described in more detail. 2-Amino-5-(β-acetoxyethylsulfone) benzothiazole of formula 7 is dispersed at 5–10° C. in acid mixture (6 parts acetic acid: 1 part propionic acid) with nitrosylsulfuric acid to carry out diazotization. The solution of coupler of formula 6 in acid mixture is cooled down at 5–10° C., and then this solution is slowly added to the diazotized solution to carry out the coupling reaction. The coupling solution is stirred, adjusted to pH 5 with NaOAc and isolated by filtration to get disperse-reactive dyes having a wide range of colors.

As shown in the following Scheme 4, the 2-amino-5-(β-acetoxyethylsulfone)benzothiazole as a raw material of the formula 7 is prepared by reacting 4-aminophenyl-β-acetoxyethylsulfone of formula 5 with KSCN and $Br_2$ in acetic acid.

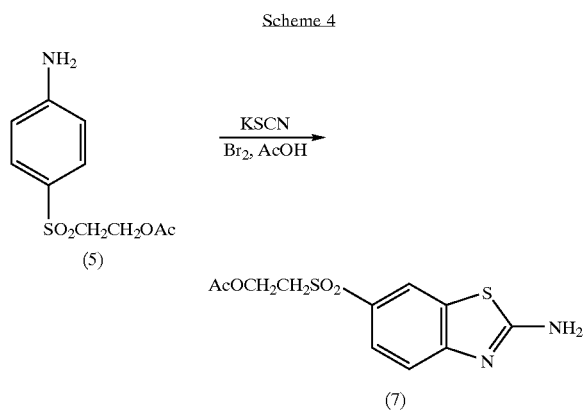

Another method to prepare the disperse-reactive dye of formula 3b is presented in the above Scheme 3. To obtain the dyestuff of formula 3b, the disperse-reactive dyes synthesized by:

(a) diazotizing 2-amino-5-(β-hydroxyethylsulfone) benzothiazole of formula 8;

(b) coupling said diazotized compound with the couplers of formula 6 keeping in acidic condition at 5–10° C.; and (c) reacting with acetic anhydride of the compound of formula 9 at 80–90° C.

In this reaction, the compound of formula 9 should be separated and dried before it is reacted with acetic anhydride.

Hereunder, the process for synthesizing a disperse-reactive dye presented by the formula 4a is described more in detail as shown in Scheme 5.

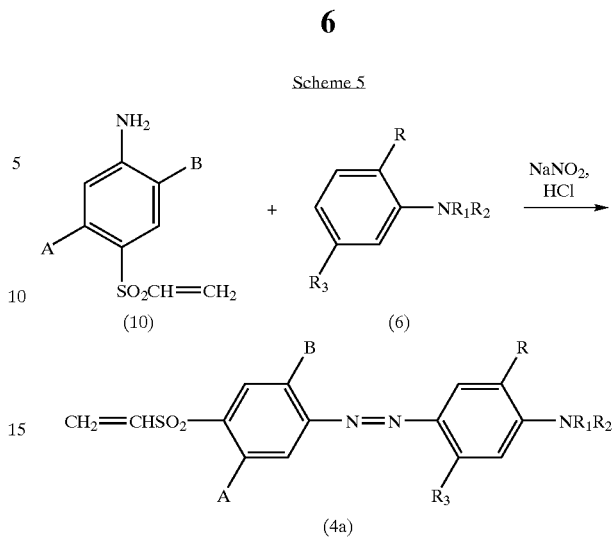

wherein each of A and B is a hydrogen, alkyl or alkoxy group, and each of R, $R_1$, $R_2$, and $R_3$ independently represents hydrogen, alkyl, alkoxy, cyanoalkyl or aminoacetyl group.

2,5-Substituted-aminophenyl-4-vinylsulfone of formula 10 is diazotized. The diazotization is accomplished by commonly available method, for example, 2,5-substituted-aminophenyl-4-vinylsulfone is dispersed in water at 0–5° C., and the diazotization is carried out with adding of concentrated hydrochloric acid and $NaNO_2$. In another vessel, the solution of coupler of formula 6 prepared by using concentrated hydrochloric acid and water is cooled down below 5° C., which is slowly added to the above prepared diazotized solution at 0–5° C. to carry out the coupling reaction. This coupling solution is stirred for a while and neutralized by using alkali solution up to pH 6.5. The final disperse-reactive dye products having vinylsulfone reactive group is isolated by filtration.

The preparation method of the disperse-reactive dyes having 2-amino-5-vinylsulfone-benzothiazole of formula 4b is expressed in more detail the following formula Scheme 6,

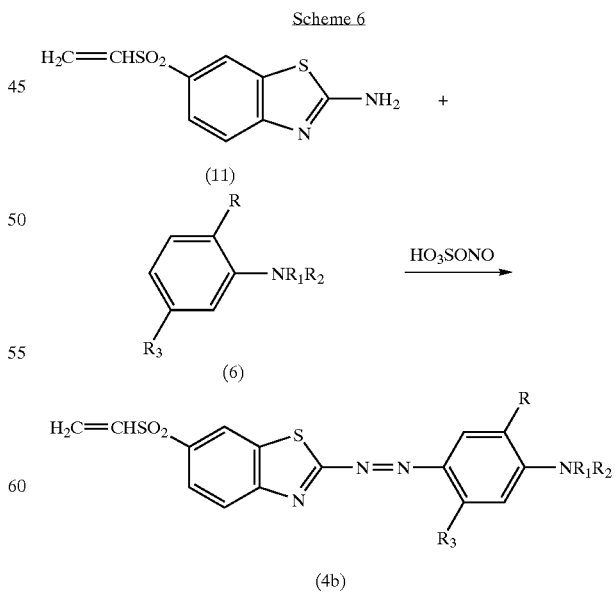

wherein each of R, $R_1$, $R_2$, and $R_3$ independently represents hydrogen, alkyl, alkoxy, cyanoalkyl or aminoacetyl group.

The preparation method of the Scheme 6 is described in more detail. 2-amino-5-vinylsulfone-benzothiazole of formula 11 is dispersed at 5–10° C. in acid mixture (6 parts acetic acid: 1 part propionic acid) with nitrosylsulfuric acid to carry out diazotization. The solution of coupler of formula 6 in acid mixture is cooled down at 5–10° C., and then this solution is slowly added to the diazotized solution to carry out the coupling reaction. The coupling solution is stirred, adjusted to pH 5 with NaOAc and isolated by filtration to get disperse-reactive dyes having a wide range of colors.

The 2-amino-5-vinylsulfone-benzothiazole as a raw material of the formula 11 is prepared by reacting aminophenyl-4-vinylsulfone of formula 10(A, B=H) with KSCN and $Br_2$ as shown in Scheme 7.

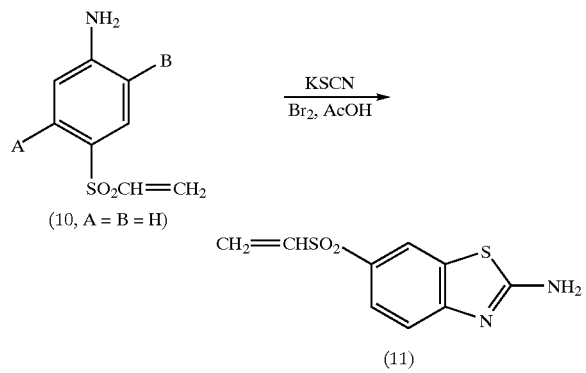

The disperse-reactive dyes of the present invention are valuable dyestuff in case of dyeing to wool, silk, nylon, polyurethane and mixed-fibers. They cover a wide range of colors with excellent brightness and good fastness, especially washing fastness by the covalent bonds to form between dye and fiber.

The following specific examples are intended to be illustrative of the invention and should not be construed as limiting the scope of the invention as defined by appended claims.

EXAMPLES OF THE COMPOUNDS CONTAINING REACTIVE GROUPS

Example 1

Preparation of 4-aminophenyl-β-acetoxyethylsulfone(5)

To 100 ml flask equipped with condenser with a balloon was added a mixture of acetic acid (60 g, 1 mol) and water (1.8 g, 0.1 mol), and then HCl gas (5.5 g, 0.15 mol) was slowly added to the reaction solution for 1.5–2 hours at 15° C. Thereafter 4-acetaminophenyl-β-hydroxyethylsulfone (24.3 g, 0.1 mol) was added to the reaction mixture and slowly heated to 70–75° C. for 1 hour and stirred 9 hours. And then the reaction mixture was cooled down to room temperature, filtered and washed with acetic acid (5 ml) twice. After drying the isolated product, it was dispersed in a mixture of ice (10 g) and water (25 ml) and neutralized with 15% $Na_2CO_3$ aqueous solution. The collected product was washed with water (5 ml) three times and dried to obtain 4-aminophenyl-β-acetoxyethylsulfone of formula 5 as a white solid (Yield=84.8%, purity=97.5%).

$^1$H NMR (300 MHz, Acetone-$d_6$): 1.83 (3H, s), 3.42 (2H, t), 4.30 (2H, t), 6.79 (2H, d), 7.56 (2H, d)

Example 2

Preparation of 2-amino-5-(β-acetoxyethylsulfone) benzothiazole(7)

To a dispersed solution of 4-aminophenyl-β-acetoxyethyl-sulfone (7.3 g, 0.03 mol) in acetic acid (40 ml) was added KSCN (6.6 g, 0.068 mol) at 20–25° C. and this mixture was stirred for 30 minutes. Bromine (2 ml, 0.039 mol) in acetic acid (10 ml) was added dropwise over 1 hour at 10–15° C. Thereafter the reaction mixture was heated to 35–40° C., stirred for 20 hours, and cooled down to room temperature. The reaction mixture was filtered and the residue was stirred in water (200 ml) at 85° C. After hot filtration, the filtrate was cooled down to room temperature and neutralized with 4N NaOH aqueous solution to pH 5. The precipitated product was filtered and washed with water to give pale yellow colored product 2-amino-5-(β-acetoxyethylsulfone)benzothiazole of formula 7 (Yield= 60%).

$^1$H NMR (300 MHz, Acetone-$d_6$): 1.72 (3H, s), 3.57 (2H, t), 4.34 (2H, t), 7.36 (2H, br s), 7.54 (1H, d), 7.76 (1H, d), 8.22 (1H, d)

Example 3

Preparation of aminophenyl-4-vinylsulfone (10, A, B=H)

The solution of 4-aminophenyl-β-sulfatoethylsulfone (57.6 g, 0.20 mol) was dispersed in water (390 ml) at 0–5° C. In the meanwhile, the pH of the reaction mixture was maintained between 8 and 9 by the addition of 4N NaOH aqueous solution (100 ml) and stirred for 2 hours at room temperature. The reaction mixture was filtered and washed with water. The isolated product was dried to give aminophenyl-4-vinylsulfone of formula 10 (A, B=H) (Yield=81%).

$^1$H NMR (300 MHz, Acetone-$d_6$): 5.95 (1H, d), 6.19 (1H, d), 5.37 (2H, br s) 6.80 (2H, d), 6.83 (1H, d of d), 7.55 (2H, d)

Example 4

Preparation of 2,5-dimethoxyaminophenyl-4-vinylsulfone (10, A, B=$OCH_3$)

The solution of 2,5-dimethoxyaminophenyl-4-β-sulfatoethylsulfone (13.6 g, 0.04 mol) in water (75 ml) was adjusted to pH 8–9 with 4N NaOH (12 ml) and heated slowly to 70–75° C. The pH of the reaction mixture was maintained between 8 and 9 by the addition of 4N NaOH aqueous solution, and stirred for 2 hours at 70–75° C. The reaction mixture was cooled down to room temperature, filtered and washed with water. The isolated product was dried to give 2,5-dimethoxyamino-phenyl-4-vinylsulfone of formula 10 (A, B=$OCH_3$) (Yield=94.7%).

$^1$H NMR (300 MHz, Acetone-$d_6$): 3.79 (3H, s), 3.82 (3H, s), 5.37 (2H, br s), 5.93 (1H, d), 6.20 (1H, d), 6.50 (1H, s), 6.93 (1H, d of d), 7.17 (1H, s)

Example 5

Preparation of 2-methoxy-5-methylaminophenyl-4-vinylsulfone (10, A=$CH_3$, B=$OCH_3$)

The solution of 2-methoxy-5-methylaminophenyl-4-β-sulfatoethylsulfone (13.0 g, 0.04 mol) in water (65 ml) was adjusted to pH 10 with 4N NaOH (17 ml) and slowly heated to 65–70° C. The reaction mixture was stirred for 1.5 hours at 65–70° C., and then cooled down to room temperature. The precipitated product was isolated by filtration and washed with water to obtain 2-methoxy-5-methylamino phenyl-4-vinyl-sulfone of formula 10 (A=CH$_3$, B=OCH$_3$) (Yield=90.3%).

$^1$H NMR (300 MHz, Acetone-d$_6$): 2.35 (3H, s), 3.85 (3H, s), 5.26 (2H, br s), 6.00 (1H, d), 6.19 (1H, d), 6.62 (1H, s), 6.76 (1H, d of d), 7.30 (1H, s)

Example 6

Preparation of 2-amino-5-vinylsulfone-benzothiazole (11)

To a dispersed solution of aminophenyl-4-vinylsulfone (36.6 g, 0.20 mol) in acetic acid (250 ml) was added KSCN (43 g, 0.44 mol) at 20–25° C. and this mixture was stirred for 30 minutes. Bromine (11.3 ml, 0.22 mol) in acetic acid (50 ml) was added dropwise over 1 hour at 10–15° C. Thereafter the reaction mixture was heated to 35–40° C., stirred for 20 hours and cooled down to room temperature. The reaction mixture was filtered. Thereafter the filtrate was diluted with water (800 ml) and neutralized with 8N NaOH aqueous solution to pH 5. The precipitated product was filtered and washed with water to give pale yellow colored product 2-amino-5-vinylsulfone-benzothiazole of formula 11 (Yield=94.5%).

$^1$H NMR (300 MHz, Acetone-d$_6$): 5.95 (1H, d), 6.20 (1H, d), 6.79 (1H, d of d), 7.39 (2H, br s), 7.41 (1H, d), 7.60 (1H, d of d), 8.06 (1H, d)

EXAMPLES OF THE DYES

Example 1

To a dispersed solution of 4-aminophenyl-β-acetoxyethyl-sulfone (7.4 g, 0.03 mol) in water (100 ml) was added 3N NaNO$_2$(10.5 ml, 0.032 mol), and the mixture was maintained at 0–5° C. Ice (30 g) and 35% HCl (6.5 ml, 0.075 mol) were added, and stirred for 1 hour at 0–5° C. to complete diazotization. The excess nitrous acid was destroyed by the addition of sulfamic acid. N,N-Diethylaniline (5.0 g, 0.033 mol) in water (100 ml) was maintained at the temperature 0–5° C. and added 35% HCl (10 ml, 0.115 mol) at a separate reactor. The ensuring solution was slowly added to the diazotized solution at 0–5° C. The mixture was stirred for 1 hour and adjusted to pH 6.5 with 15% Na$_2$CO$_3$ solution. The precipitated dye was collected by filtration and obtained orange colored disperse-reactive dye of formula 12 (Yield=88.5%, λ$_{max}$=459 nm, ε=38,100).

(12)

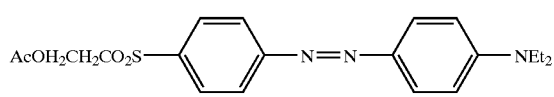

Example 2–7

The examples in the following Table 1 were carried out in the manner of Example 1 using the appropriate coupler (C, 0.033 mol) to obtain disperse-reactive dyes of formula 13.

(13)

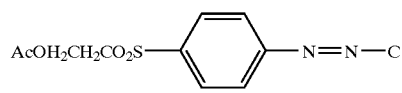

TABLE 1

AcOH$_2$CH$_2$CO$_2$S—⟨⟩—N=N—C

| Example No. | Coupler(C) | ε | λ$_{max}$ (nm) | Yield g (%) |
|---|---|---|---|---|
| 2 | ![NEt$_2$ with H$_3$C] | 37,400 | 463 | 10.3 (82.4) |
| 3 | ![NEt$_2$ with H$_3$COCHN] | 40,800 | 486 | 13.2 (95.6) |
| 4 | ![OCH$_3$, NEt$_2$, H$_3$COCHN] | 33,500 | 510 | 13.1 (89.1) |
| 5 | ![OCH$_3$, N(H)(CH$_2$CH$_2$CN), H$_3$C] | 27,000 | 447 | 11.1 (83.5) |
| 6 | ![OCH$_3$, N(H)(CH$_2$CH$_2$CN), H$_3$COCHN] | 27,500 | 490 | 13.1 (89.7) |
| 7 | ![OCH$_3$, NEt$_2$, EtOOCHN] | 31,600 | 510 | 13.8 (88.5) |

Example 8

4-Aminophenyl-β-acetoxyethylsulfone (7.4 g, 0.03 mol) was diazotized by the same method of example 1. 1,4-dimethyl-2,6-dioxo-1,2,3,6-tetrahydro-pyridine-3-carbonitrile (5.04 g, 0.031 mol) was dissolved in 0.4N NaOH solution (80 ml) and maintained at the temperature 0–5° C. The ensuring solution was slowly added to the diazotized solution at a temperature 0–5° C. and stirred for 1 hour to complete coupling. And then 15% Na$_2$CO$_3$ solution was slowly added to adjust the pH of the mixture to 6.5. The precipitated product was collected by filtration and obtained yellow colored disperse-reactive dye of formula 14 (Yield=93.6%, $\lambda_{max}$=420 nm, $\epsilon$=49,000).

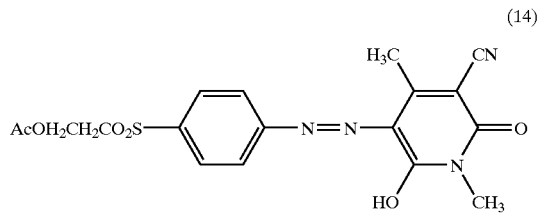

(14)

Example 9

To a mixture of 2-amino-5-(β-acetoxyethylsulfone) benzothiazole (6.0 g, 0.02 mol) in acid mixture (40 ml, 6 parts acetic: 1 part propionic acid) was added dropwise 42% HO$_3$SONO (4.4 ml, 0.023 mol) over 30 minutes at temperature 5–10° C. This reaction mixture was stirred for 1 hour at 5–10° C. to complete diazotization. Excess nitrous acid was destroyed by the addition of urea. A solution of N,N-diethylaniline (3.3 g, 0.022 mol) in acid mixture (33 ml) was maintained at 5–10° C., which was added slowly to the diazotized solution and then stirred for 1 hour. Sodium acetate (13.3 g) was added and stirred for 30 minutes to adjust the pH 5 of the reaction mixture. And then the reaction mixture was poured into ice-cold water (50 ml), stirred for a while, filtered and dried. The violet colored disperse-reactive dye was obtained as shown in formula 15 (Yield= 98.9%, λmax=527 nm, $\epsilon$=25,800).

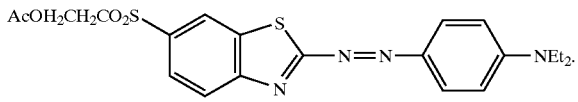

(15)

Example 10–16

The examples in the following Table 2 were carried out in the manner of example 9 using the appropriate coupler (D, 0.022 mol) to obtain disperse-reactive dyes of formula 16.

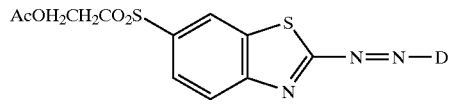

(16)

TABLE 2

| Example No. | Coupler(D) | $\epsilon$ | $\lambda_{max}$ (nm) | Yield g (%) |
|---|---|---|---|---|
| 10 | ![structure with NEt$_2$, H$_3$C] | 23,400 | 536 | 8.0 (84.4) |
| 11 | ![structure with NEt$_2$, H$_3$COCHN] | 41,200 | 542 | 9.0 (87.1) |
| 12 | ![structure with OCH$_3$, NEt$_2$, H$_3$COCHN] | 22,800 | 585 | 6.7 (61.2) |
| 13 | ![structure with OCH$_3$, N(H)CH$_2$CH$_2$CN, H$_3$C] | 27,200 | 530 | 8.5 (84.8) |
| 14 | ![structure with OCH$_3$, N(H)CH$_2$CH$_2$CN, H$_3$COCHN] | 31,800 | 549 | 8.9 (81.8) |
| 15 | ![structure with N(CH$_2$CH$_2$CN)$_2$] | 226,800 | 495 | 10.0 (99.0) |
| 16 | ![structure with N(CH$_2$CH$_2$CN)$_2$, H$_3$C] | 232,700 | 506 | 10.3 (98.3) |

Example 17

This reaction was carried out in the manner of example 9 using 2-amino-5-(β-hydroxyethylsulfone)benzothiazole (5.2 g, 0.02 mol) instead of 2-amino-5-(β-acetoxyethylsulfone)benzothiazole, with N,N-diethylaniline (3.3 g, 0.022 mol) as a coupler to give the dye of formula 17.

The dried compound (1 g) of formula 17 in acetic anhydride (3.6 ml) was heated to 85–90° C. for 1.5 hours. Thereafter, this reaction mixture was cooled down to room temperature, poured into ice-cold water 80 g, and stirred for 1 hour. The produced solid product was isolated by filtration to give dye of formula 18 (Yield=100%).

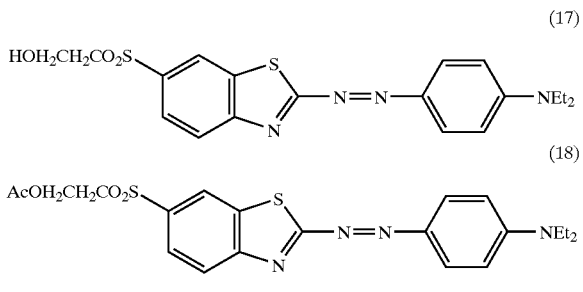

Example 18

To a dispersed solution of aminophenyl-4-vinylsulfone (3.66 g, 0.02 mol) in water (80 ml) was added 3N $NaNO_2$ (7 ml, 0.021 mol) and the mixture was maintained at 0–5° C. Ice (30 g) and 35% HCl (4.4 ml, 0.051 mol) were added and stirred for 1 hour at 0–5° C. to complete diazotization. Excess nitrous acid was destroyed by the addition of sulfamic acid. A solution of N,N-diethyl-m-toluidine (3.6 g, 0.022 mol) in water (65 ml) was maintained at the temperature 0–5° C. and added 35% HCl (6.5 ml, 0.075 mol) at a separate reactor.

The ensuring solution was slowly added to the diazotized solution at 0–5° C. The mixture was stirred for 1 hour and the pH of the solution was adjusted to 6.5 with 15% $Na_2CO_3$ solution. The precipitated dye was collected by filtration and obtained red colored disperse-reactive dye of formula 19 (Yield=95.2%, $\lambda_{max}$=467 nm, $\epsilon$=34,500).

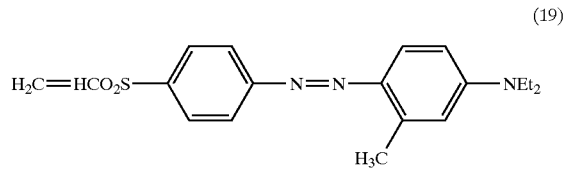

Example 19–20

The examples in the following Table 3 were carried out in the manner of example 18 using the appropriate coupler (E, 0.022 mol) to obtain disperse-reactive dyes of formula 20.

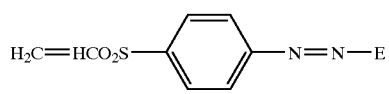

TABLE 3

| Example No. | Coupler(E) | $\epsilon$ | $\lambda_{max}$ (nm) | Yield g (%) |
|---|---|---|---|---|
| 19 | 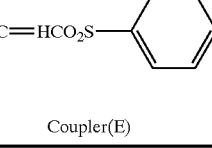 | 40,600 | 488 | 7.2 (90.0) |
| 20 | 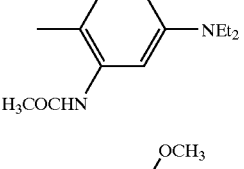 | 36,300 | 511 | 8.5 (98.8) |

Example 21

Aminophenyl-4-vinylsulfone (3.66 g, 0.02 mol) was diazotized by the same method of example 18. 1,4-Dimethyl-2,6-dioxo-1,2,3,6-tetrahydro-pyridine-3-carbonitrile (3.41 g, 0.021 mol) was dissolved in 0.4N NaOH solution (80 ml) and maintained at the temperature 0–5° C. The ensuring solution was slowly added to the diazotized solution at a temperature 0–5° C. and stirred for 1 hour to complete coupling reaction. And then 15% $Na_2CO_3$ solution was slowly added to adjust the pH of the mixture to 6.5. The precipitated product was collected by filtration and obtained yellow colored disperse-reactive dye of formula 21 (Yield= 94.4%, $\lambda_{max}$=421 nm, $\epsilon$=50,400).

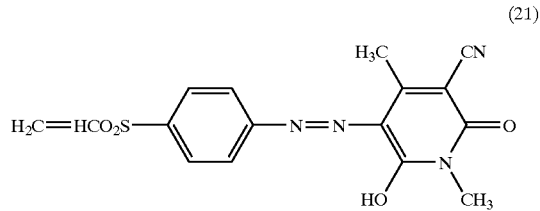

Example 22–26

The examples in the following Table 4 are carried out in the manner of example 18 using 2,5-dimethoxyaminophenyl-4-vinylsulfone (4.86 g, 0.02 mol) as diazo compound with the appropriate coupler (F, 0.022 mol) to obtain disperse-reactive dyes of formula 22.

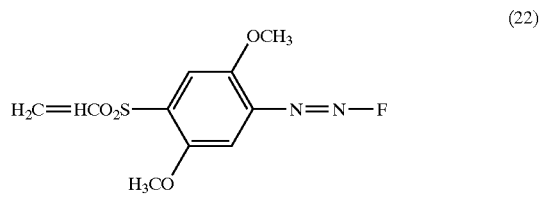

TABLE 4

H₂C=HCO₂S—[benzene with OCH₃, H₃CO]—N=N—F

| Example No. | Coupler(F) | ε | λmax (nm) | Yield g (%) |
|---|---|---|---|---|
| 22 | [methyl-phenyl-NEt₂] | 29,400 | 471 | 7.3 (90.5) |
| 23 | [methyl, H₃C-phenyl-NEt₂] | 32,400 | 479 | 8.0 (95.9) |
| 24 | [methyl, H₃COCHN-phenyl-NEt₂] | 46,300 | 505 | 9.1 (98.9) |
| 25 | [methyl, OCH₃, H₃COCHN-phenyl-NEt₂] | 36,700 | 530 | 8.3 (84.7) |
| 26 | [methyl, OCH₃, H₃COCHN-phenyl-N(H)(CH₂CH₂CN)] | 33,500 | 508 | 9.5 (97.5) |

TABLE 5

H₂C=HCO₂S—[benzene with OCH₃, H₃CO]—N=N—G

| Example No. | Coupler(G) | ε | λmax (nm) | Yield g (%) |
|---|---|---|---|---|
| 27 | [methyl-phenyl-NEt₂] | 28,700 | 457 | 6.4 (82.7) |
| 28 | [methyl, H₃C-phenyl-NEt₂] | 30,600 | 465 | 7.7 (96.0) |
| 29 | [methyl, H₃COCHN-phenyl-NEt₂] | 42,900 | 496 | 8.5 (95.7) |
| 30 | [methyl, OCH₃, H₃COCHN-phenyl-NEt₂] | 31,800 | 521 | 6.9 (66.2) |
| 31 | [methyl, OCH₃, H₃COCHN-phenyl-N(H)(CH₂CH₂CN)] | 28,100 | 500 | 8.6 (91.3) |

Example 27–31

The examples in the following Table 5 are carried out in the manner of example 18 using 2-methoxy-5-methylaminophenyl-4-vinyl-sulfone (4.6 g, 0.02 mol) as diazo compound with the appropriate coupler (G, 0.022 mol) to obtain disperse-reactive dyes of formula 23.

(23)

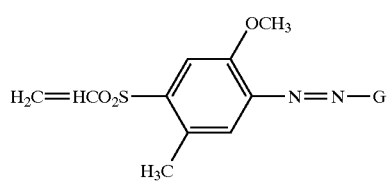

Example 32

To a mixture of 2-amino-5-vinylsulfone-benzothiazole (4.8 g, 0.02 mol) in acid mixture (40 ml, 6 parts acetic: 1 part propionic acid) was added dropwise 42% HO₃SONO (4.4 ml, 0.023 mol) over 30 minutes at temperature 5–10° C. This reaction mixture was stirred for 1 hour at 5–10° C. to complete diazotization. Excess nitrous acid was destroyed by the addition of urea. A solution of N,N-diethylaniline (3.3 g, 0.022 mol) in acid mixture (33 ml) was maintained at 5–10° C., which was added slowly to the diazotized solution and then stirred for 1 hour. Sodium acetate (13.3 g) was added and stirred for 30 minutes to adjust the pH 5 of the reaction mixture. And then the reaction mixture was poured into ice-cold water (50 ml), stirred for a while, filtered and dried.

The violet colored disperse-reactive dye was obtained as shown in formula 24 (Yield=74%, λmax=524 nm, ε=26,000).

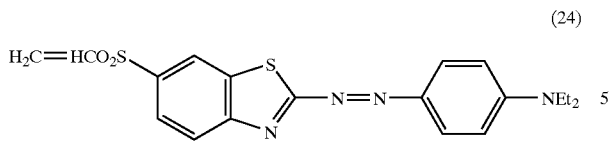

(24)

What is claimed is:

1. A disperse-reactive dye represented by the following formula 3,

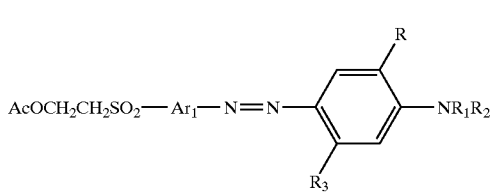

(3)

wherein AcO represents an acetoxy group; each of R, $R_1$, $R_2$, and $R_3$ independently represents a hydrogen atom, an alkyl-, an alkoxy-, a cyanoalkyl- or an aminoacetyl group; and $Ar_1$ represents a benzothiazole group.

2. A process for preparing disperse-reactive dyes represented by the formula 3a, which comprises the steps of:
   (a) diazotizing the compound of formula 5; and
   (b) coupling said diazotized compound with a compound having the general formula 6 to obtain the compound of formula 3a,

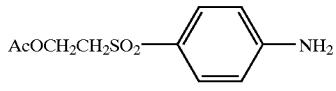

(7)

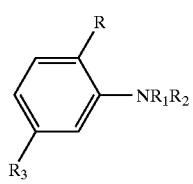

(6)

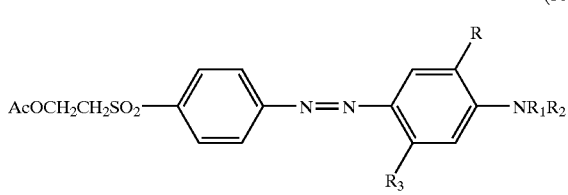

(3b)

wherein AcO represents an acetoxy group; and each of R, $R_1$, $R_2$, and $R_3$ independently represents a hydrogen atom, an alkyl-, an alkoxy-, a cyanoalkyl- or an aminoacetyl group.

3. A process for preparing disperse-reactive dyes represented by the formula 3b, which comprises the steps of:
   (a) diazotizing the compound of formula 7; and
   (b) coupling said diazotized compound with a compound having the general formula 6 to obtain the compound of formula 3b,

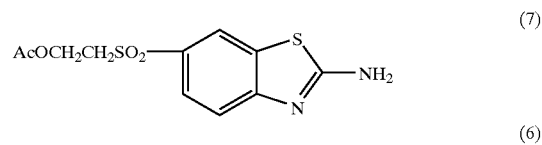

(7)

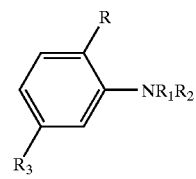

(6)

wherein AcO represents an acetoxy group; and each of R, $R_1$, $R_2$, and $R_3$ independently represents a hydrogen atom, an alkyl-, an alkoxy-, a cyanoalkyl- or an aminoacetyl group.

4. A process for preparing disperse-reactive dyes represented by the formula 3b comprising the steps of:
   (a) diazotizing 2-amino-5-(β-hydroxyethylsulfone) benzothiazole of formula 8;
   (b) coupling said diazotized compound with a compound having the general formula 6 to obtain the compound of formula 9; and
   (c) acetylating the compound of formula 9 with acetic anhydride to obtain the compound of formula 3b,

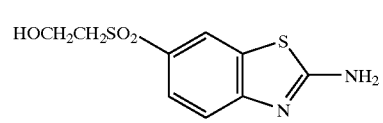

(8)

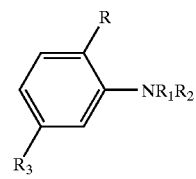

(6)

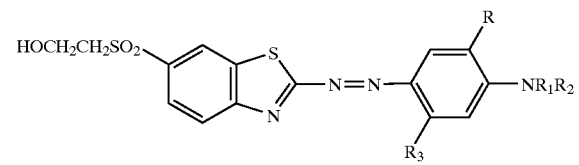

(9)

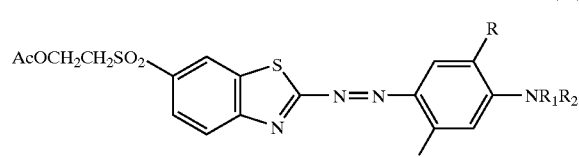

(3b)

wherein AcO represents an acetoxy group; and each of R, $R_1$, $R_2$, and $R_3$ independently represents a hydrogen atom, an alkyl-, an alkoxy-, a cyanoalkyl- or an aminoacetyl group.

5. A disperse-reactive dye represented by the following formula 4b,

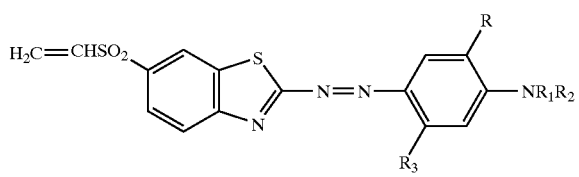

(4b)

wherein each of R, $R_1$, $R_2$, and $R_3$ independently represents a hydrogen atom, an alkyl-, an alkoxy-, a cyanoalkyl- or an aminoacetyl group.

6. A process for preparing disperse-reactive dyes represented by the formula 4b, which comprises the steps of:
   (a) diazotizing the compound of formula 11; and
   (b) coupling said diazotized compound with a compound having the general formula 6 to obtain the compound of formula 4b,

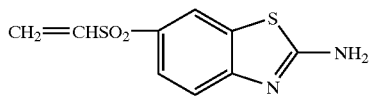

(11)

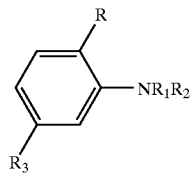

(6)

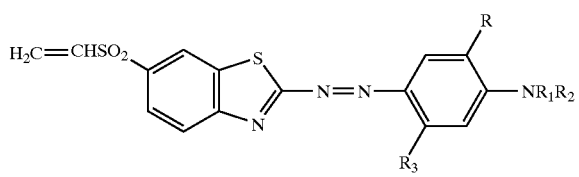

(4b)

wherein each of R, $R_1$, $R_2$, and $R_3$ independently represents a hydrogen atom, an alkyl-, an alkoxy-, a cyanoalkyl- or an aminoacetyl group.

* * * * *

UNITED STATES PATENT AND TRADEMARK OFFICE
CERTIFICATE OF CORRECTION

PATENT NO. : 6,884,876 B2
DATED : April 26, 2005
INVENTOR(S) : Sea Wha Oh et al.

It is certified that error appears in the above-identified patent and that said Letters Patent is hereby corrected as shown below:

Column 17,
Line 36, "(7)" should read -- (5) --.

Signed and Sealed this

Twenty-third Day of August, 2005

JON W. DUDAS
*Director of the United States Patent and Trademark Office*